United States Patent [19]
Gehr et al.

[11] Patent Number: 5,828,847
[45] Date of Patent: Oct. 27, 1998

[54] DYNAMIC SERVER SWITCHING FOR MAXIMUM SERVER AVAILABILITY AND LOAD BALANCING

[75] Inventors: Chuck Royal Gehr, Louisville; Paul David Von Behren, Boulder; Michael Patrick Williams, Longmont; Robert Barry Wood, Niwot, all of Colo.

[73] Assignee: Storage Technology Corporation, Louisville, Colo.

[21] Appl. No.: 639,939

[22] Filed: Apr. 19, 1996

[51] Int. Cl.⁶ ...................................................... G06F 17/00
[52] U.S. Cl. ...................................................... 395/200.69
[58] Field of Search ............................... 395/200.69, 675, 395/200.59

[56] References Cited

U.S. PATENT DOCUMENTS

| | | | |
|---|---|---|---|
| 5,119,488 | 6/1992 | Takamatsu et al. | 395/200.69 |
| 5,341,477 | 8/1994 | Pitkun et al. | 395/675 |
| 5,444,693 | 8/1995 | Arslan et al. | 395/200.69 |
| 5,522,046 | 5/1996 | Mcmillen et al. | 395/200.69 |
| 5,535,334 | 7/1996 | Merkley et al. | 395/200.69 |
| 5,581,753 | 12/1996 | Terry et al. | 395/617 |
| 5,588,151 | 12/1996 | Segal et al. | 395/200.69 |
| 5,603,029 | 2/1997 | Aman et al. | 395/675 |
| 5,630,133 | 5/1997 | Hotea et al. | 395/675 |

*Primary Examiner*—Ellis B. Ramirez
*Attorney, Agent, or Firm*—Duft, Graziano & Forest, P.C.

[57] ABSTRACT

The dynamic server switching system maintains a list in each client which identifies the primary server for that client and the preferred communication method as well as a hierarchy of successively secondary servers and communication method pairs. In the event that the client does not have requests served by the designated primary server or the designated communication method, the system traverses the list to ascertain the identity of the first available alternate server-communication method pair. The client then uses this retrieved data to initiate future requests. The client periodically tests the primary server-communication method pair to determine whether the fault has been cleared. If so, the client reestablishes the originally selected primary server-communication method pair as the request route. This system dynamically load balances in the face of failures, handles transient faults and can use a neuromorphic processing element to monitor system activity and rewrite entries in the lists as a function of changing system activity. In this manner, the system provides dynamic server switching for maximum service availability without consuming significant processing resources.

23 Claims, 6 Drawing Sheets

DYNAMIC SERVER SWITCHING FOR MAXIMUM SERVER AVAILABILITY AND LOAD BALANCING

FIELD OF THE INVENTION

This invention relates to client-server systems and, in particular, to a method and apparatus for providing a fault tolerant client-server system architecture which utilizes multiple servers and dynamic server switching to provide maximum server availability and load balancing for the client processes with minimum processing and administrative overhead.

PROBLEM

It is a problem in the field of client-server systems to provide a fault tolerant server management methodology which ensures maximum availability of adequate server resources to process client requests. The fault tolerance aspect of server management must not adversely impact on the system performance while providing the high service availability. This problem is especially pertinent in the field of data storage subsystems and, in particular, automated cartridge library systems which provide users with access, via library access server software, to data stored on a large number of magnetic tape cartridges which are stored in the automated cartridge library system.

Prior art computer systems have migrated to multiprocessor architectures wherein multiple virtual processors can be implemented on a single physical processor system. In particular, the MVS system manufactured by International Business Machines, Inc. has implemented a high availability operating system environment which comprises an architecture termed "Parallel Sysplex." Applications in a parallel sysplex implementation comprise multiple MVS systems extant on multiple physical processors, which are distributed throughout the data processing system complex, so that the client process is presented with multiple servers which are managed as a single group to process the client requests. The fault tolerance in this architecture is group mitigated, in that the group of concurrently operational MVS servers is self managed to identify a single point of failure and disable the failed server. In order to maintain the desired level of service, the group then must promote another server to the group to replace the disabled server. This architecture is frugal with client resources, since all the fault detection and remediation is handled in the server group. However, the server group must identify the failed server and then manage the shutdown of the failed server and its replacement. This fault recovery process is processing resource intensive. Furthermore, server group state changes must be broadcast to the members of the server group, which requires close timing synchronization in the presence of non-uniform communication services, in order to preserve a consistent state among the servers located in the group.

An alternative method of fault tolerance and high availability is client based control wherein the client processes perform the tasks of identifying a single point of failure and disabling the failed server. In order to maintain the desired level of service, the client process must locate another server to replace the disabled server. This architecture is frugal with server resources, since all the fault detection and remediation is handled in the client which encounters the failure. However, the client must identify the failed server and then manage the location of a replacement. This fault recovery process is processing resource intensive. In addition, there may be different types of clients accessing a common server, and clients which may not reside on identical hardware or software platforms. The client-base fault tolerance process must then be replicated in each of the different client processes, with the associated development costs being multiplied by the number of client process versions.

These existing fault tolerance systems also do not encompass outage tolerance, which represents a significant source of service interruptions, with outage tolerance addressing the events which include, but are not limited to: planned or scheduled down time for maintenance of server software and other processor software, system reconfigurations, communication link upgrades and reconfigurations. These planned outages often significantly outweigh unplanned outages in terms of system availability. In addition, system maintenance represents a significant cost of operation for a processor complex. The resources dedicated to system management for managing large, complex data processing systems may dominate the information systems budget of an organization. The automation of fault tolerance, provision of automated outage tolerance, and the associated reduction in system maintenance and management efforts, all represent a significant cost savings in data processing operations. However, such capabilities are presently unavailable in existing data processing systems.

SOLUTION

The above described problems are solved and a technical advance achieved in the field by the method and apparatus for dynamic server switching for maximum availability and load balancing. The preferred embodiment of this dynamic server switching system uses a client communication interface exception handling routine which enables the client processes to redirect requests to alternate servers with minimal effort when the designated primary server or communication mode is unavailable. The dynamic server switching system also automatically returns to a normal configuration when the fault has been cleared. The use of a common client communication interface based fault tolerance scheme significantly reduces the client process development costs and facilitates the portability of the fault tolerance solution architecture.

In a client-server system, multiple servers are provided to ensure both that the plurality of clients receive an adequate level of service and a high level of availability is maintained when faults occur. The term "server" as used herein can represent either a specific server process which is running on a processor or a general name for a service which is available on the processor. In the dynamic server switching system, each client directs requests to its designated primary server and multiple clients typically access each server. The fault tolerance aspect of the dynamic server switching system architecture of the present invention makes use of a client communication interface based control which enables a client to simply redirect requests to a predetermined alternate server or communication mode without the overhead of prior art systems. This is accomplished by maintaining a list in each client communication interface component which identifies the primary server for that client and the preferred communication method as well as a hierarchy of successive alternate servers and communication method pairs. In the event that the client does not have requests served by the designated primary server or the designated communication method, the client communication interface traverses the list to ascertain the identity of the first available alternative server-communication method pair. The client then completes existing requests and uses this retrieved data for future requests. The client periodically tests the primary server-communication method pair to determine whether the fault has been cleared. If so, the client reestablishes the originally selected primary server-communication method pair as the request route for newly generated requests while processing existing requests via the alternate server which received these requests.

This architecture enables service overloads and outages to be automatically and immediately addressed and later cleared without undo system reconfiguration overhead. The dynamic server switching system does not have to diagnose failures but simply responds to a failure of client-server communication. This dynamic server switching system dynamically and automatically switches servers and communication methods in the face of failures or overloads, handles transient faults and can be adapted as a function of changing system conditions without undo administrator input. In particular, the hierarchical organization of the list at each client which identifies server-communication method pairs can be manually created by the system administrator and updated on an as needed basis, or a neuromorphic processing element can monitor system activity and rewrite entries in the lists as a function of changing system activity. In this manner, the dynamic server switching system provides dynamic server switching for maximum service availability without consuming significant processing resources.

DETAILED DESCRIPTION

Figure 1:
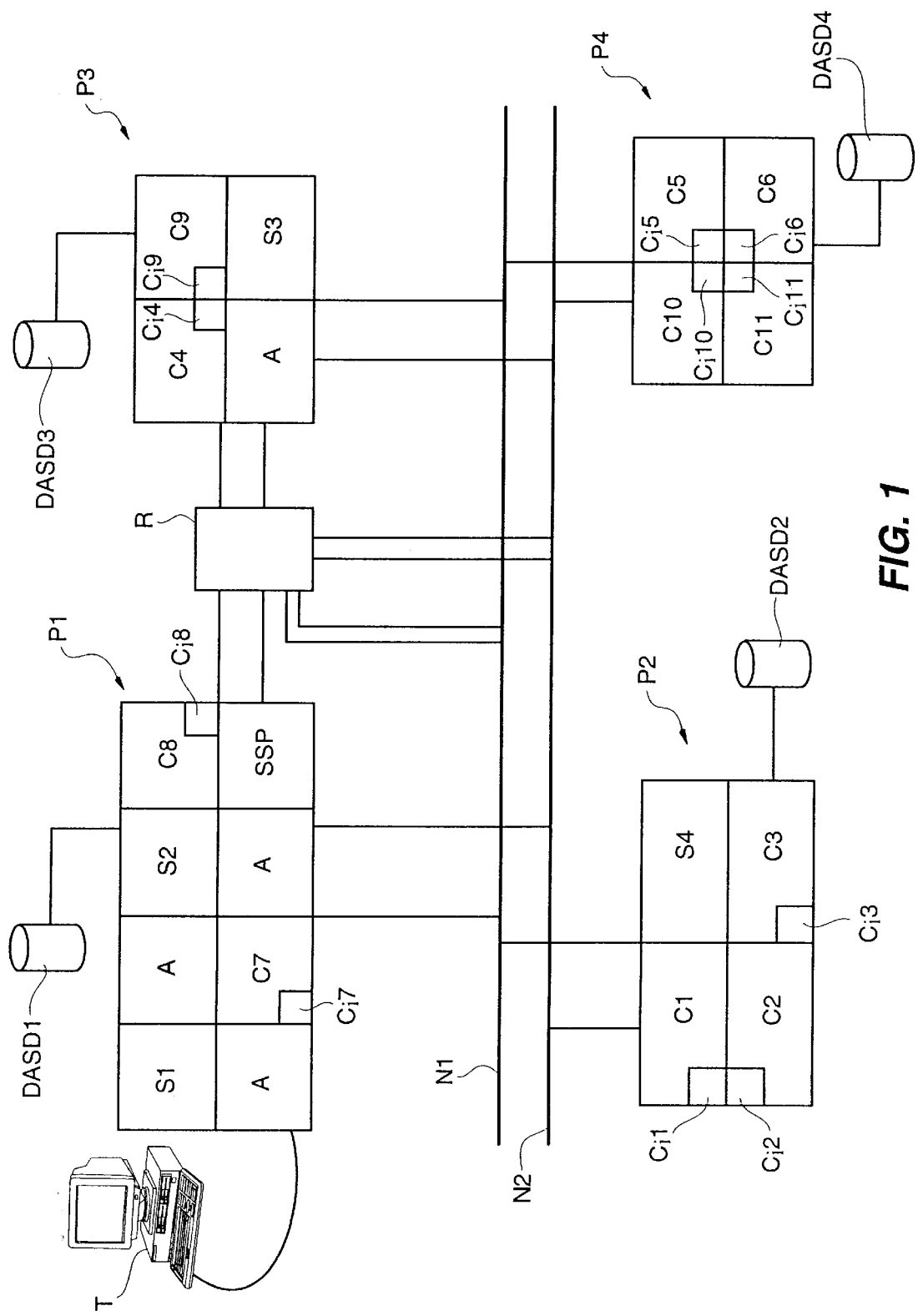
FIG. 1 illustrates in block diagram form the overall architecture of the preferred embodiment of the dynamic server switching system of the present invention.

FIG. 1 illustrates in block diagram form the overall architecture of the preferred embodiment of the dynamic server switching system of the present invention and a system environment in which it is implemented. In particular, a plurality of processors P1–P4 are interconnected via networks N1 and N2 and each processor P1–P4 has at least one client C1–C11 and/or server S1–S4 active thereon. In addition, other application processes A not linked to the clients C1–C11 and servers S1–S4 of this description are running on the various processors P1–P4. The architecture illustrated in FIG. 1 is illustrative of the types of processor interconnections that are possible. Two networks N1, N2 are illustrated interconnecting the processors P1–P4 and a message router R is also shown as interconnecting processors P1 and P3 with the networks N1, N2, wherein message router R routes inter-process communications between the processes active on processors P1 and P3 and networks N1, N2. The networks are well known and can be Ethernet and/or SNA networks as an example. Each processor P1–P4 typically is equipped with a data storage subsystem such as disk drives DASD1–DASD4 for the storage of data.

The overall dynamic server switching system comprises a client communication interface Ci associated with each client process as well as optional centralized server switching process SSP, as is described in additional detail below. The dynamic server switching system functions to direct requests from clients C1–C11 to designated servers S1–S4 for execution of the requests. The data generated as a result of the server actions are then returned to the requesting client. It should be noted that a server S1–S4 can be self serving, in that it can also function as a client for some service requests.

The initial routing of each request from a client is defined by a client communication interface Ci1–Ci11 which is part of or associated with each client process C1–C11. The client communication interface Ci includes request routing data which designates the primary server for this client process as well as alternate servers for use when the primary server is unavailable. Corresponding entries are included in this data which designate preferred communication methods between client-server pairs. Thus, the list entries uniquely define both a destination and a method of communicating with the selected destination. This routing information functions to load balance on a per client basis since each client has its own routing list. A server switching process SSP is shown as residing on processor P1. The server switching process SSP functions to populate the client communication interfaces Ci1–Ci11 with data, update this data and optionally provide a system operator with access to this data via terminal T. In this regard, the server switching process SSP can be a neuromorphic element which monitors interprocess communication activity in the data processing complex and revises the list entries in the client communication interface elements Ci as a function of the present state of the data processing complex. The selection of a neuromorphic processor, such as a neural network, provides the ability to learn the characteristics which are unique to the data processing system complex. In this manner, the server switching process SSP then function as the human system administrator would in managing the system maintenance.

Client-Server System Philosophy

In client-server system operations, multiple servers are provided to perform a particular function for the overall system, such as access to data stored in an automated cartridge library system, to ensure both that the plurality of clients receive an adequate level of service and a high level of server availability is maintained. Each client directs requests to a designated primary server and multiple clients typically access each server. The fault tolerance aspect of the system architecture of the dynamic server switching system makes use of a client communication interface based control which enables a client to simply redirect requests from an unresponsive server to a predetermined alternate server without the overhead of prior art systems. This is accomplished by maintaining data in the client communication interface Ci located in each client, which data identifies the primary server for that client and the preferred communication method as well as a hierarchy of successive alternate servers and communication method pairs. In the event that the client does not have requests served by the designated primary server or the designated communication method, the client communication interface traverses the list to ascertain the identity of the first available alternative server-communication method pair. The client then uses this retrieved data to initiate future requests. When an alternate server is being used, the client periodically tests the primary server-communication method pair to determine whether the fault has been cleared. If so, the client reestablishes the originally selected primary server-communication method pair as the request route, while wrapping up the existing communications with the alternate server-communication method pair. For example, the system illustrated in FIG. 1 is equipped with two networks N1, N2. Assume that network N1 is an Ethernet network while network N2 is a SNA network. The list entries for a client can be server-Sn/method-Ethernet as the primary and the first secondary entry can be server-Sn/method-SNA. Such a list simple reroutes interprocess communications to the same destination via an alternate route. The list can vary either or both servers and communication methods, as a function of the system configuration. For the purpose of simplicity, the following description is primarily couched in terms of alternate servers, although from the above-description it is evident that communication methods can be used as the alternate routing entry.

This architecture enables the system administrator to have a significant amount of flexibility in regulating the operation of the client-server system. For example, by judicious selection of the entries in the routing list, the data processing system can be partitioned into a plurality of groups, with each group having its own collection of clients and servers. In addition, the alternate routing can traverse group boundaries or remain within the group. The routing list is shown as a single ordered list, with each entry comprising a single server-communication method pair. The list can be configured to include more than one pair in the list entries so that requests can be sent to multiple servers. Alternatively, the multiple entries can represent a priority ordering within that level of the list for server-communication method pairs. The list can have as the first alternate entry, the same data as in the primary entry, so that the first alternate destination is a retry of the primary server-communication pair. It is obvious that significant flexibility is available to the system administrator with the capabilities of the dynamic server switching system.

Client Communication Interface

The client communication interface Ci comprises the apparatus which functions to interconnect a client with other processes in the data processing system. A communication interface used in data processing systems generally comprises a client communication interface which interconnects with a mating server communication interface. The communication interfaces enforce a common protocol or communication standards between otherwise disparate client and server implementations. An ideal communication component has a custom application interface and a common network interface, such that all clients look identical to a server and all servers look identical to a client. The client communication interface and the server communication interface can be merged into a single common entity, functioning as a communication broker which resides neither in the client or the server hardware and software components. In the preferred embodiment of the invention disclosed herein, the communication interface comprises separate client and server elements for the purpose of illustration. The client communication interface is described herein in pertinent part and the server communication interface is a well known element and is not described herein for the sake of brevity.

Figure 2:
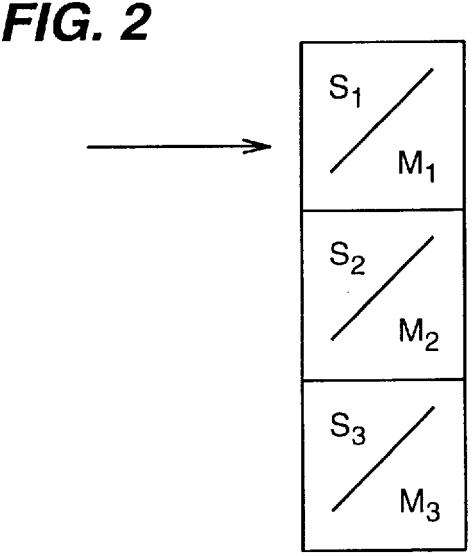
FIG. 2 illustrates in block diagram form a linked list embodiment of the alternate routing scheme.

The client communication interface includes data which is maintained by the dynamic server switching system to identify the designated server for this particular client. The client communication interface data is maintained at each client, and can be in the form of a list or linked list as shown in FIG. 2. The list comprises a sequence of pairs of entries, with each pair containing data which identifies a particular server and an associated communication method. Thus, for this particular client, such as client C1, the sequence of server-communication method pairs is: server S1/communication method M1; server S2/communication method M2; server S3/communication method M1. This data can be manually created by the system administrator and updated on an as needed basis via terminal T or a neuromorphic processing element resident in server switching process SSP can monitor system activity and rewrite entries in the lists as a function of changing system activity. In this manner, the dynamic server switching system provides dynamic server switching for maximum service availability and load balancing without consuming significant processing resources.

Figure 5A:
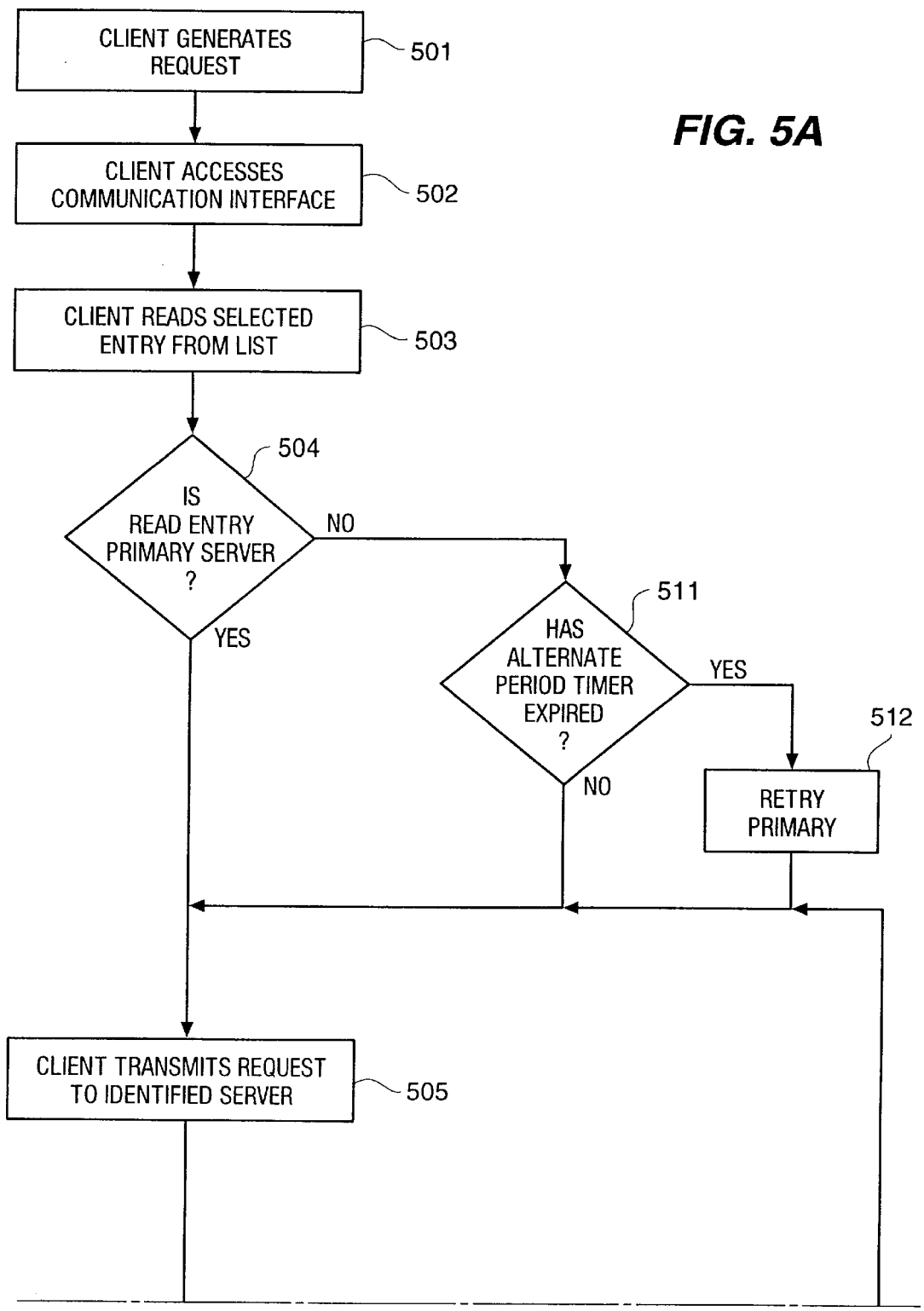
FIGS. 5A–5B illustrate in flow diagram form the operation of the dynamic server switching system.
Figure 5B:
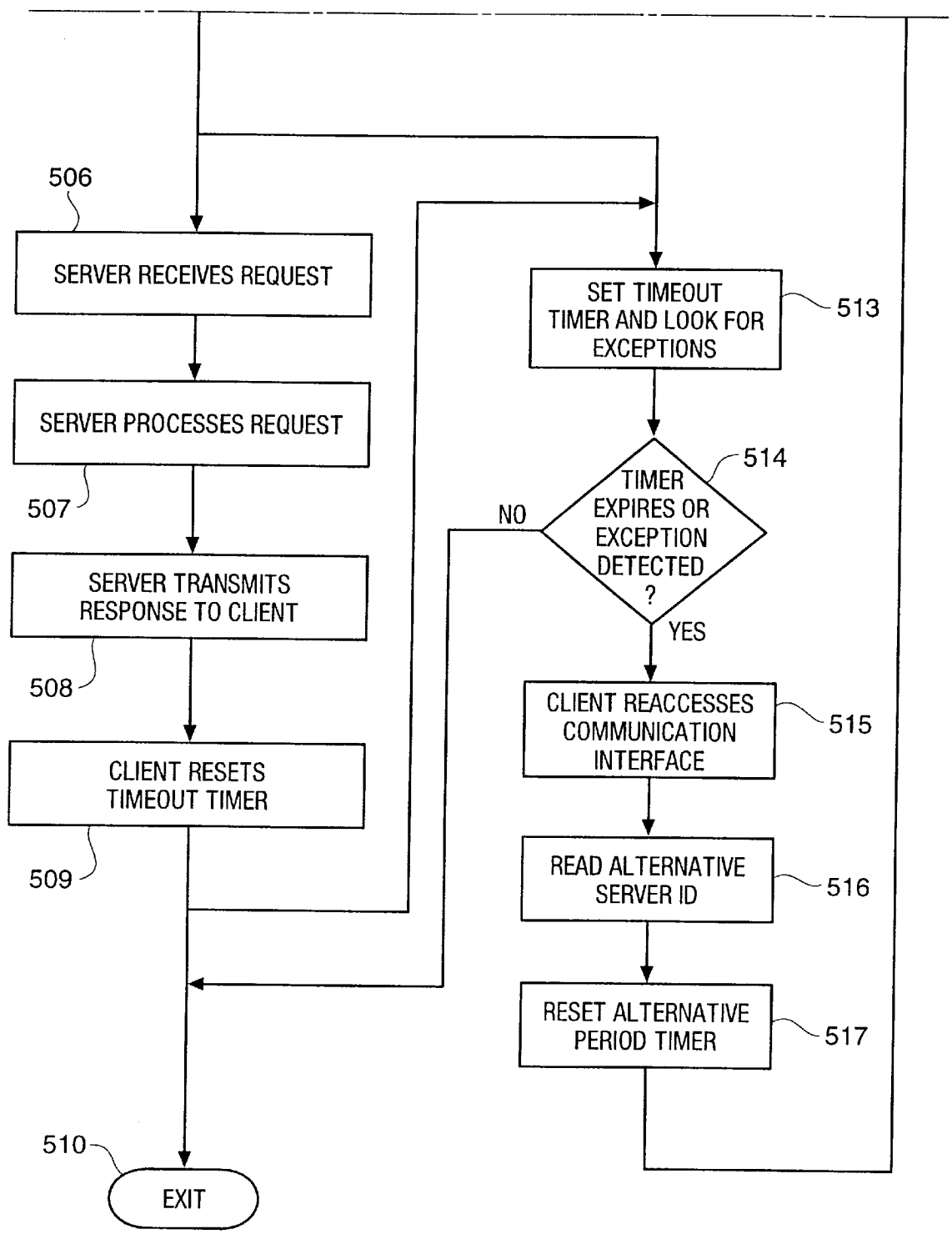

The operation of this dynamic server switching process is illustrated in flow diagram form in FIGS. 5A and 5B. At step 501, the client C1 generates a request which is to be served by one of servers S1–S3 in the class of servers S1–S4 (with server S4 being a spare server as described below). This request is processed in the client C1 by accessing the client communication interface Ci1 at step 502 and reading a selected entry at step 503 from the list stored therein. The list is illustrated in FIG. 2, and for the purpose of this description comprises a list of hierarchically ordered server-communication method pairs. There is a pointer associated with this list to indicate the presently active entry, which may not be the head of the list.

At step 504, the client communication process Ci1 determines whether the pointer is directed to an entry that is not the head of the list. If so, then the primary server-communication method pair is unavailable and processing branches to step 511 where the client communication process Ci1 determines whether an alternate period timer has expired. The alternate period timer is set at step 517 in response to a failure in the client-primary server communication as described below. If this timer has expired, then the client communication process Ci1 at step 512 retries the designated primary server (at the head of the list) by substituting the identity of the primary server S1 into the communication and thereby determining whether the trouble has been cleared and normal operation can again be resumed. If the timer has not expired, the client communication process Ci1 continues to use the presently designated alternate server S2 (for example).

Processing advances to step 505 where the client C1 transmits the request to the identified server, which for the purpose of this description is assumed to be the primary server S1. The client C1 at step 513 sets a timeout timer to determine whether the transmitted message is not responded to in a predetermined period, which would indicate an error condition which must be corrected. (The timeout timer can be located in the client communication interface Ci1, but is described as being located in the client C1 for this description.) Concurrently, at step 506, the designated server S1 receives the request and at step 507 processes the request to generate a response message which is transmitted back to the requesting client C1 at step 508.

If there is a fault condition present in the data processing system, in the form of a failure to deliver the message to the server S1, or a failure of the server S1 to process the request, or the response message not returning to the client C1, or the server or communication methods being overloaded and messages being delayed or blocked, the timeout timer expires at step 514 to indicate a system fault or an exception message is returned to the client process C1 to indicate an error. If the communication process is completed prior to timer timeout, then the return message causes the timeout timer to be reset and processing advances from step 514 to step 510 where the process exits. If the timeout timer times out, at step 515 the client C1 reaccesses the client communication interface Ci1 to increment the list by moving the pointer to the next successive entry contained therein and at step 516 reads an alternative server-communication method pair from the list. At step 517 client communication process Ci1 sets the alternate period timer so that the failed primary server is automatically retried after a predetermined period of time to thereby enable the system to self correct or to enable maintenance operations to clear the fault. Once the alternate period timer is set, processing returns to step 505 and the originally transmitted message is retransmitted to the new identified destination.

When the fault is cleared from the primary server or the primary communication method, the restoration process gradually returns the primary server to full operational status. In particular, any existing requests are processed to completion on the alternate server to which they were sent while the newly generated requests are concurrently transmitted to the now active primary server. Once the requests processed by the alternate server are cleared, the client terminates the communication session with the selected alternate server. This process eliminates the need for the maintenance personnel to reconfigure the system once a fault is cleared, since the dynamic server switching system is self restoring.

Thus, the above-described process automatically routes messages from clients to servers according to a predetermined hierarchically ordered server-communication method preference scheme. The routing is self-directed in that the failure of a communication causes the system to dynamically switch servers to enable the requesting process to try another available server. The process is self restoring in that the primary server is periodically retried to ensure that the system returns to its initial configuration once the fault is cleared. This enables the system to immediately respond to intermittent overloads, transient faults and to "work around" routine maintenance operations which may take equipment out of service for a period of time. The power of this arrangement is that the entries in the list can be updated to reflect additional servers becoming part of the system, reassessment of the hierarchical ordering based on temporal variations in system operation, customization to provide priority service for certain processes, and other administrative capabilities that are desired for the particular system implementation.

Server Management Examples

Given that the dynamic server switching system can automatically redirect requests, the issue of optimal management is to architect a configuration which most efficiently addresses the needs of a particular system. The term optimal implies that the solution is simple, even when the system configuration is changed; the solution avoids single points of failure; the solution prevents cascading failures; and the solution uses the smallest set of servers for the lowest customer cost.

The load allocation chart of Table A indicates a typical multi-server system wherein eleven clients direct service requests to four servers.

TABLE A

| Server | Client | | | | | | | | | | | Total |
|---|---|---|---|---|---|---|---|---|---|---|---|---|
| | C1 | C2 | C3 | C4 | C5 | C6 | C7 | C8 | C9 | C10 | C11 | |
| S1 | 10 | 15 | | 20 | | | | | | | | 45 |
| S2 | | | 5 | | 30 | | | | 10 | | | 45 |
| S3 | | | | | | 15 | | 5 | | 25 | | 45 |
| S4 | | | | | | | 20 | | | | 25 | 45 |

The matrix of Table A illustrates how the varying client workloads can be distributed over a set of servers. The servers S1–S4 are each capable of processing a maximum of P=65 requests per unit time and thus four servers S1–S4 can handle an aggregate service load of 260 requests per unit time. If one of the servers S1–S4 fail, the aggregate workload drops to a rate of 195 requests per unit time, which is still in excess of the illustrated load of 180 requests per unit time. However, the planning of workload allocation represents a complex problem, since if server S4 fails, the load of 20 requests for client C7 and the load of 25 requests for client C11 cannot be absorbed by any other single server without causing a cascading overload. Similarly, the 30 unit workload for client C5 and the 25 unit workload for client C10 represent similar problems. In this case, the workload of all the servers must be readjusted to accommodate the failure of any single server. This type of load redirection in response to the failure of a single server is disruptive of system operation, since many of the clients C1–C11 and many of the servers S1–S4 are required to change their operation in the event of a failure of a server. If the "failure" is simply a transient overload, the system load redirection can result in significant "churning", where system resources are consumed by the load redirection process. In addition, this type of load redirection can cause cascading failures wherein the switching of workload from a failed server to alternate servers cause the alternate servers to overload, causing a cascading of the single failure throughout the system.

N+i Sparing

An alternate solution to the high availability problem is to provide at least one unused server to absorb the entirety of the workload of a failed server. This is termed the "N+1" server configuration, wherein N servers are required to serve the collective needs of the population and a single spare server is available. The chart of Table B illustrates this load distribution:

TABLE B

| Server | Client | | | | | | | | | | | Total |
|---|---|---|---|---|---|---|---|---|---|---|---|---|
| | C1 | C2 | C3 | C4 | C5 | C6 | C7 | C8 | C9 | C10 | C11 | |
| S1 | 10 | 15 | | 20 | | 15 | | | | | | 60 |
| S2 | | | 5 | | 30 | | | | 10 | 25 | | 60 |
| S3 | | | | | | | 20 | 5 | | | 25 | 60 |
| S4 | | | | | | | | | | | | 0 |

Figure 3:
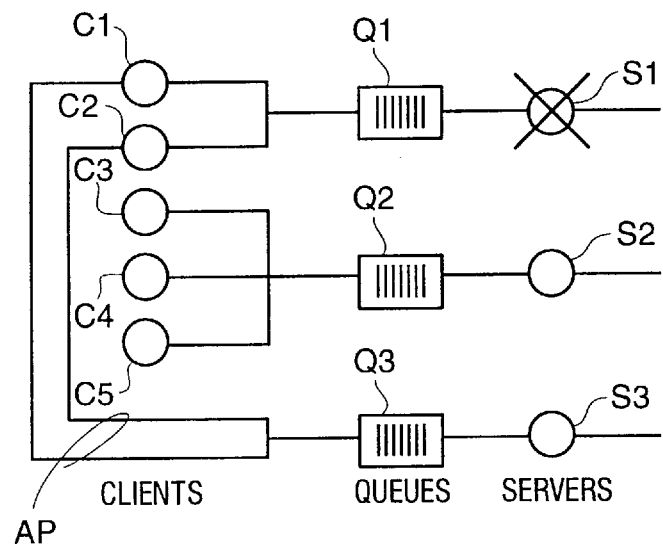
FIG. 3 illustrates in block diagram form an N+1 implementation of the dynamic server switching system.

As can be seen from this chart and in part by the block diagram of FIG. 3, the workload of the clients C1–C11 and the capacity of the servers S1–S4 are calculated and the system is configured to have one more server S4 than necessary to process the normal load of service requests. This concept can be generalized to "N+i" where i reserve servers are provided. The extra servers (server S3 in FIG. 3) are defined and activated, but under normal workload conditions no work is directed to them. These alternate servers (S4 in Table B) have identical capacity to the primary servers S1–S3 and may effectively replace a failed server in the event of a primary server failure. The benefits of this configuration are that the alternate server S4 is designated as an alternate for all clients C1–C11, the alternate server S4 consumes no processing resources, and the load balancing effort is limited to the zero failure scenario. The diagram of FIG. 3 illustrates the switching of requests in schematic form. When server S1 fails, the requests from client C1 are routed via alternate request paths AP to the alternate server S3.

Time Varying Loads

Figure 6:
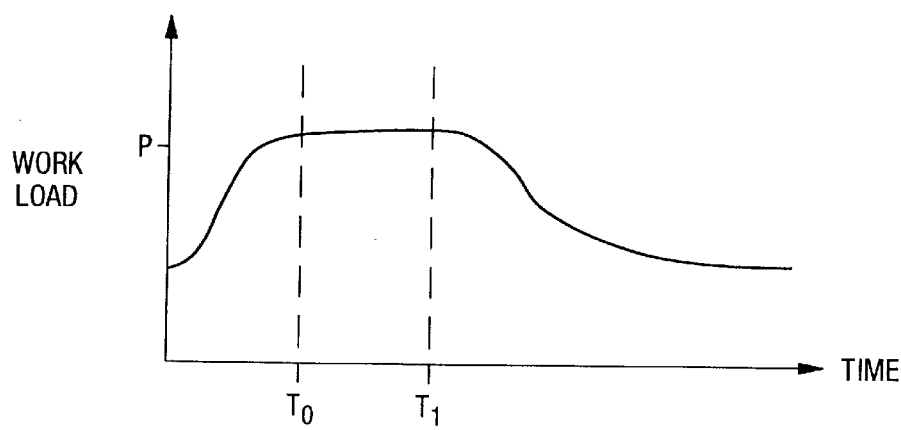
FIGS. 6–8 illustrate waveforms illustrative of the client workload.
Figure 7:
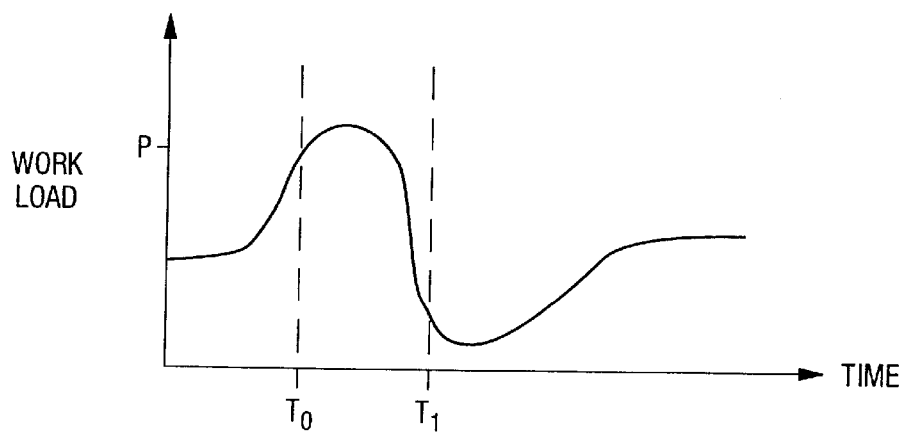
Figure 8:
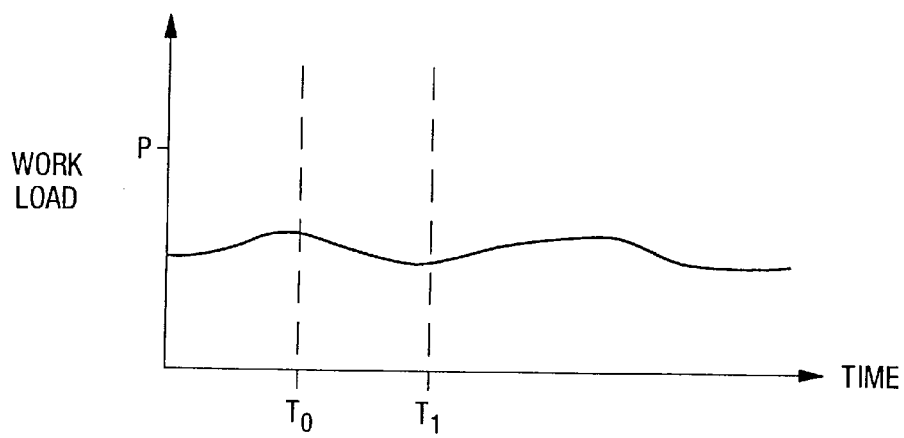

The above description assumes a static system, where the requests are fairly uniform over time. However, it is unlikely that all client-server systems are fairly uniform in their operation. It is more likely that the request volume is time-varying and the above load balancing is described in terms of either peak load or average load. However, the temporal nature of request load characteristics can add another layer of complexity to this system. In particular, the FIGS. 6–8 illustrate charts of typical request loads on the X-axis plotted against time on the Y-axis. While these loads may average to manageable quantities, or even be fairly uniform as is shown in FIG. 8 for server S3, the drastic variability of the loads diagrammed in FIG. 6 and 7 present failure management problems. The designation P on the Y-axis of FIGS. 6–8 represents the peak load capacity of the respective processors. It is evident that redirecting the load of server S1 as illustrated in FIG. 6 to the server S2 whose load is diagrammed in FIG. 7 has a negative consequence at time T0 since both servers experience a peak at this time and the cumulative load would exceed the peak capacity P of the server S2. This redirection option is advantageous if it occurs at time T1, since the peak in the load curve of server S1 is offset by the valley in the load curve of server S2. Thus, the dynamic nature of the server switching becomes significantly more complex when the load variability is considered.

The server switching process SSP can monitor present load activity and maintain statistics of past load activity patterns to account for the time varying nature of the loads. In particular, the server switching process SSP can rewrite the entries in the client communication interface lists on a periodic basis to reflect the present state of the system and therefore adapt the server switching process as system loads vary. The server switching process SSP can also maintain a plurality of sets of routing data for use in the lists in each client communication interface processes Ci1–Ci11, which sets represent different states of the client-server system. Thus, for example, one set of routing data can represent Monday data, with characteristics representative of work load ramp up at the beginning of the week, and a second set of data can represent routing weekday activity. Other sets of data can represent Friday ramp down of work load while yet another set of data can represent quiescent weekend activity, with the data backups and routing maintenance activity factored in to the data. The dynamic server switching system can therefore simply customize the characteristics of the overall data processing complex with minimal effort, even reducing the number of active servers when workloads dictate.

This dynamic server switching system provides a significant benefit in the case of nondisruptive maintenance, wherein a system administrator renders one of the servers or communication methods inoperable to perform some system maintenance on the disabled element. The dynamic server switching automatically compensates for this maintenance activity without requiring the system administrator to manually reconfigure the system. In addition, short-term overloads can trigger a server switch scenario to automatically and instantaneously respond to the overload.

Automated Cartridge Library Embodiment

Figure 4:
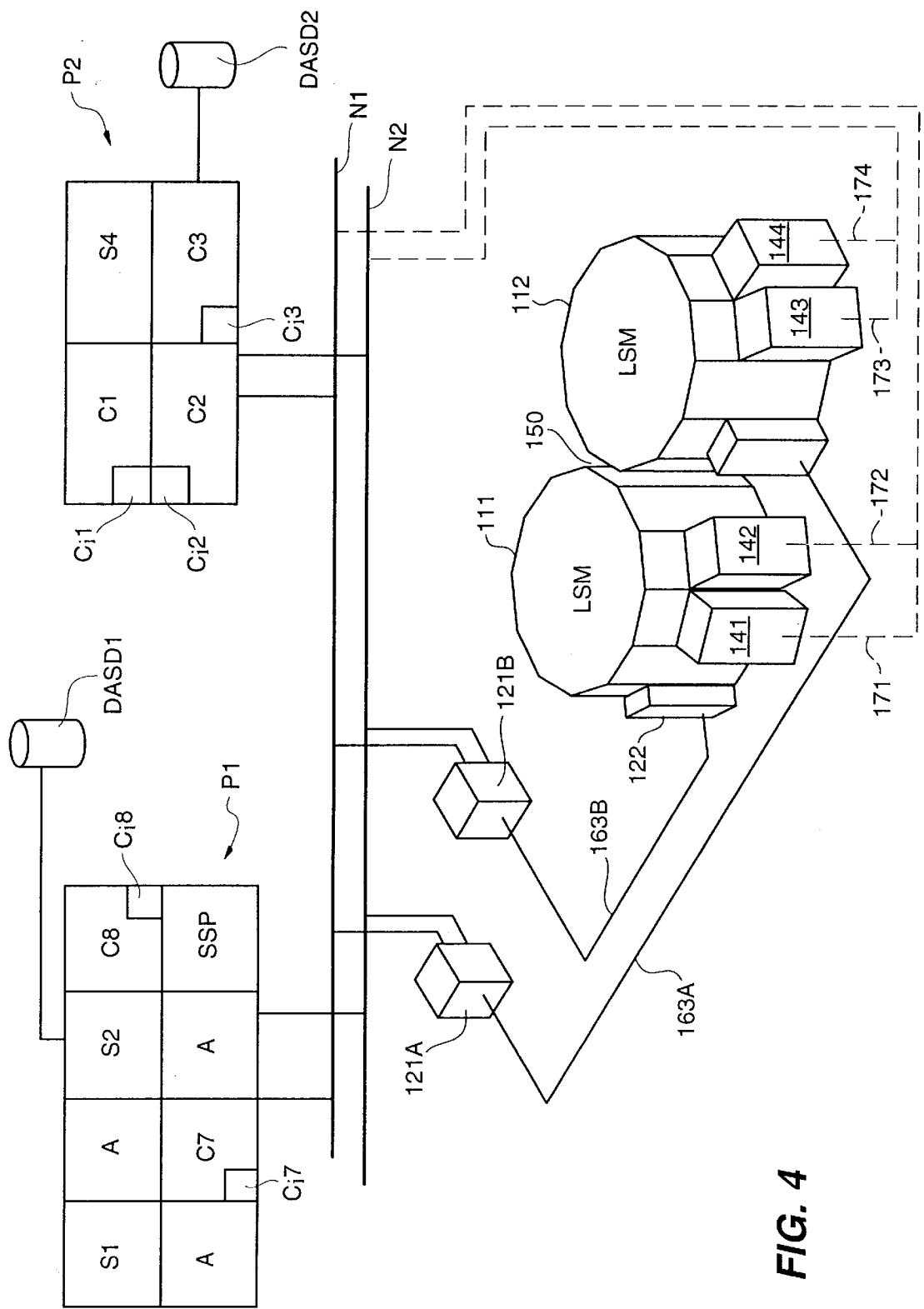
FIG. 4 illustrates in block diagram form an embodiment of the dynamic server switching system wherein the servers are library access modules for an automated cartridge library system.

FIG. 4 illustrates in block diagram form, one application of the dynamic server switching system of the present invention. In particular, one type of data storage subsystem presently in widespread use is the automated cartridge library system which robotically stores and retrieves a large number of magnetic tape cartridges for a plurality of processors. When a client on a processor calls for a data set stored on a magnetic tape cartridge which is located in the automated cartridge library system, the automated cartridge library system retrieves the magnetic tape cartridge from its storage location and mounts the magnetic tape cartridge in a tape drive so that the data set can be read from the magnetic tape cartridge and transmitted to the requesting client process. This system therefore represents a specific embodiment of a client-server system, where the clients are the processes which request data sets and the servers are the library access software modules extant on the processors.

The architecture of a typical automated cartridge library system and its interconnection to processors P1 and P2 is illustrated in block diagram form in FIG. 4. In particular, a plurality of data processors (P1, P2 from FIG. 1) are shown connected to a multi-module automated cartridge library system by means of two paths: a control path 163A, 163B and a data path 171–174. A plurality of data processors can be connected to a plurality of automated cartridge library systems and two data processors P1, P2 and a single automated cartridge library system are described for simplicity of description, and not as a limitation of the concepts described herein. The automated cartridge library system illustrated in FIG. 4 comprises two library modules 111, 112, each of which stores a large number of magnetic tape cartridges in storage locations therein. The library storage modules 111, 112 include a robotic mechanism which functions to retrieve the magnetic tape cartridges from their assigned storage location and transport the magnetic tape cartridges to tape drive systems 141–144 for mounting therein. A library management unit 121A, 121B is connected between the processors P1, P2 and each library module 111, 112. The library management units 121A, 121B function to convert the client process request for a tape volume to signals which control the operation of the robotic mechanism contained within the library modules 111, 112. For example, the client process C1 on processor P2 requests access to a data set stored on a magnetic tape cartridge which is located in library module 111. In this example, the primary library access server software (server S4) functions to interface the automated cartridge library system to the client process C1 resident on processor P2. Server S4 functions to interface the automated cartridge library system to the processors P1, P2 and service the requests generated by clients C1–C3, C7, C8 shown in FIG. 4. The library access server software S4 receives the request from the client process C1 and transmits the request in the form of the magnetic tape cartridge identification data to library management unit 121A. Library management unit 121A activates the robotic mechanism in library module 111 to retrieve the identified magnetic tape cartridge and mount it on an available tape drive 141–144 for reading the requested data set therefrom. The data is transmitted via selected ones of data paths 171–174 (shown in dotted line form) to the requesting client process C1.

It is evident that to maintain a high level of availability for the data stored in the automated cartridge library for the client processes, a number of servers (library access software) must be active and operational to avoid a single point of failure. Thus, the dynamic server switching system architecture described above can be implemented in the automated cartridge library application since numerous clients transmit requests to the servers (library access software), which requests must be served in a reasonable period of time. There are many possible failure modes in such a system and the dynamic server switching system overlaid on the automated cartridge library system improves service, ensures high availability, enables load balancing and gracefully responds to faults, overloads and delays. The dynamic server switching system need not be concerned with the hardware implementation of the system of FIG. 4, since the dynamic server switching paradigm is client-server focussed and responds to a lack of closure in a communication process between client-server, independent of the hardware used to implement the server and the communication methods. Thus, the dynamic server switching system avoids system bottlenecks and maintains a rapid exchange of communication between client and server so that the client processes obtain the benefit of the rapid data retrieval capability of the automated cartridge library system.

Summary

As can be seen by this description, the dynamic server switching system maintains a list in each client communications interface component which identifies the primary server for that client and the preferred communication mode as well as a hierarchy of successively secondary servers and communication method pairs. In the event that the client does not have requests served by the designated primary server or the designated communication method, then traverses the list to ascertain the identity of the first available alternative server-communication path pair. The client then uses this retrieved data to initiate future requests. The client periodically tests the primary server-communication method pair to determine whether the fault has been cleared. If so, the client reestablishes the originally selected primary server-communication method pair as the request route. Since each client has its own list, the load presented to each of the servers can be balanced across the available servers.

We claim:

1. A dynamic server switching system for a client-server network that is populated by a plurality of servers and a plurality of clients, wherein clients and servers communicate via communication methods that serve to interconnect the clients and servers, said dynamic server switching system comprising:

means for storing routing data that defines a hierarchical ordering of servers for each of said plurality of clients, including a primary server and at least one alternate server designated for each of said plurality of clients;

means, responsive to a one of said plurality of clients failing to receive service from said primary server defined for said one client, for retrieving an entry from said stored routing data to identify an available one of said least one alternate server designated for said one of said plurality of clients; and means, responsive to said retrieved entry, for directing service requests that are received from said one of said plurality of clients to said identified one of said at least one alternate server as defined by said retrieved data.

2. The dynamic server switching system of claim 1 further comprising:

means, responsive to said client directing service requests to said identified alternate server, for retrying said primary server on a periodic basis.

3. The dynamic server switching system of claim 2 further comprising:

means, responsive to said primary server responding to a retry service request, for directing newly generated service requests from said client to said primary server.

4. The dynamic server switching system of claim 3 further comprising:

means, responsive to said primary server responding to a retry service request, for completing existing service requests that were previously directed to said identified alternate server.

5. The dynamic server switching system of claim 1 further comprising:

means for revising entries in said stored routing data as a function of client-server activity.

6. The dynamic server switching system of claim 5 wherein said means for revising entries maps temporal variations in client activity to said routing data.

7. The dynamic server switching system of claim 5 wherein said means for revising entries creates a plurality of sets of said routing data, each of said sets of said routing data representative of a state of said client-server system, and writes a selected one of said sets of said routing data into said means for storing in response to said client-server system attaining said state.

8. The dynamic server switching system of claim 1 further comprising:

means for maintaining at least one server as an unused spare server;

means, responsive to a one of said primary servers being unavailable to said clients, for activating said spare server to serve requests in place of said unavailable primary server.

9. The dynamic server switching system of claim 1 wherein said means for storing routing data comprises a communication interface located within each of said clients.

10. The dynamic server switching system of claim 9 wherein said means for storing routing data additionally stores communication method data indicative of a communication protocol utilized in said communication interface located in said client.

11. A dynamic server switching system for an automated cartridge library system that stores a plurality of magnetic tape cartridges, each of which contains data for use by at least one processor connected thereto, wherein said automated cartridge library system includes a plurality of library access modules resident on said at least one processor for enabling said at least one processor to obtain access to said data stored on said plurality of magnetic tape cartridges, and wherein said at least one processor also includes a plurality of client processes, wherein said client processes communicate with said plurality of library access modules via communication methods that serve to interconnect the client processes and said plurality of library access modules, said dynamic server switching system comprising:

means for storing routing data that defines a hierarchical ordering of said plurality of library access modules for each of said plurality of client processes, including a primary library access module and at least one alternate library access module designated for each of said plurality of client processes;

means, responsive to a one of said plurality of client processes failing to receive service from said primary library access module defined for said one client process, for retrieving an entry from said stored routing data to identify an available one of said least one alternate library access module designated for said one of said plurality of client processes; and means, responsive to said retrieved entry, for directing service requests that are received from said one of said plurality of client processes to said identified one of said at least one alternate library access modules as defined by said retrieved data.

12. The dynamic server switching system of claim 11 further comprising:

means, responsive to said client process directing service requests to said identified alternate library access module, for retrying said primary library access module on a periodic basis; and means, responsive to said primary library access module responding to a retry service request, for directing newly generated service requests from said client process to said primary library access module.

13. The dynamic server switching system of claim 11 further comprising:

means for maintaining at least one library access module as an unused spare library access module; and means, responsive to a one of said primary library access modules being unavailable to said client processes, for activating said spare library access module to serve requests in place of said unavailable primary library access module.

14. A method for dynamically switching servers for a client-server network that is populated by a plurality of servers and a plurality of clients, wherein clients and servers communicate via communication methods that serve to interconnect the clients and servers, said method comprising the steps of:

storing routing data that defines a hierarchical ordering of servers for each of said plurality of clients, including a primary server and at least one alternate server designated for each of said plurality of clients, in a memory;

retrieving, in response to a one of said plurality of clients failing to receive service from said primary server defined for said one client, an entry from said stored routing data located in said memory to identify an available one of said least one alternate server designated for said one of said plurality of clients; and directing, in response to said retrieved entry, service requests that are received from said one of said plurality of clients to said identified one of said at least one alternate server as defined by said retrieved data.

15. The method of claim 14 further comprising the step of:

retrying, in response to said client directing service requests to said identified alternate server, said primary server on a periodic basis.

16. The method of claim 14 further comprising the step of:

directing, in response to said primary server responding to a retry service request, newly generated service requests from said client to said primary server.

17. The method of claim 14 further comprising the step of:

revising entries in said stored routing data as a function of client-server activity.

18. The method of claim 17 wherein said step of revising entries creates a plurality of sets of said routing data, each of said sets of said routing data representative of a state of said client-server system and writes a selected one of said sets of said routing data into said means for storing in response to said client-server system attaining said state.

19. The method of claim 14 further comprising the steps of:

maintaining at least one server as an unused spare server; and activating, in response to a one of said primary servers being unavailable to said clients, said spare server to serve requests in place of said unavailable primary server.

20. The dynamic server switching system of claim 14 wherein said memory for storing routing data is located in a communication interface located within each of said clients and said memory additionally stores communication method data indicative of a communication protocol utilized in said communication interface located in said client.

21. A method for dynamically switching servers for an automated cartridge library system that stores a plurality of magnetic tape cartridges, each of which contain data for use by at least one processor connected thereto, wherein said automated cartridge library system includes a plurality of library access modules resident on said at least one processor for enabling said at least one processor to obtain access to said data stored on said plurality of magnetic tape cartridges, and wherein said at least one processor also includes a plurality of client processes, wherein said client processes communicate with said plurality of library access modules via communication methods that serve to interconnect the client processes and said plurality of library access modules, said method for dynamically switching servers comprising the steps of:

storing in a memory routing data that defines a hierarchical ordering of said plurality of library access modules for each of said plurality of client processes, including a primary library access module and at least one alternate library access module designated for each of said plurality of client processes;

retrieving from said memory, in response to a one of said plurality of client processes failing to receive service from said primary library access module defined for said one client process, an entry from said stored routing data to identify an available one of said least one alternate library access module designated for said of said plurality of client processes; and directing, in response to said retrieved entry, service requests that are received from said one of said plurality of client processes to said one of said at least one identified alternate library access module as defined by said retrieved data.

22. The method of claim 21 further comprising the steps of:

retrying, in response to said client process directing service requests to said identified alternate library access module, said primary library access module on a periodic basis; and directing, in response to said primary library access module responding to a retry service request, service requests from said client process to said primary library access module.

23. The method of claim 21 further comprising the steps of:

maintaining at least one library access module as an unused spare library access module; and activating, in response to a one of said primary library access modules being unavailable to said client processes, said spare library access module to serve requests in place of said unavailable primary library access module.

* * * * *